(12) United States Patent
Kimoto

(10) Patent No.: US 8,804,514 B2
(45) Date of Patent: Aug. 12, 2014

(54) WIRELESS TERMINAL DEVICE

(75) Inventor: Yukinao Kimoto, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 264 days.

(21) Appl. No.: 13/039,623

(22) Filed: Mar. 3, 2011

(65) Prior Publication Data

US 2011/0211528 A1 Sep. 1, 2011

Related U.S. Application Data

(63) Continuation of application No. PCT/JP2009/004016, filed on Aug. 21, 2009.

(30) Foreign Application Priority Data

Sep. 8, 2008 (JP) ............................... P.2008-229776

(51) Int. Cl.
| | | |
|---|---|---|
| *G01R 31/08* | (2006.01) | |
| *H04L 12/56* | (2006.01) | |
| *H04L 12/54* | (2013.01) | |

(52) U.S. Cl.
CPC ............ *H04L 47/18* (2013.01); *H04L 12/5602* (2013.01)
USPC ........... 370/231; 370/328; 370/331; 370/352; 370/395.21; 370/466; 370/467; 370/477

(58) Field of Classification Search
None
See application file for complete search history.

(56) References Cited

U.S. PATENT DOCUMENTS

| 7,974,312 | B2* | 7/2011 | Ahmadi et al. ............... 370/477 |
| 2007/0086384 | A1* | 4/2007 | Katsu et al. .................. 370/331 |
| 2007/0223491 | A1* | 9/2007 | Baek et al. ............... 370/395.21 |
| 2007/0255793 | A1 | 11/2007 | Kwon | |
| 2008/0008159 | A1* | 1/2008 | Bourlas et al. ................ 370/352 |

FOREIGN PATENT DOCUMENTS

| JP | 2004-320159 | 11/2004 |
| JP | 2006-279923 | 10/2006 |
| JP | 2007-074194 | 3/2007 |
| JP | 2007-517453 | 6/2007 |
| JP | 2007-189661 | 7/2007 |
| WO | 2006/117644 | 11/2006 |

OTHER PUBLICATIONS

IEEE Std 802.16-2004, Part 16: Air Interface for Fixed Broadband Wireless Access Systems, Oct. 1, 2004.

(Continued)

*Primary Examiner* — Faruk Hamza
*Assistant Examiner* — Aixa A Guadalupe-Cruz
(74) *Attorney, Agent, or Firm* — Jacobson Holman, PLLC.

(57) ABSTRACT

There is disclosed a wireless terminal device in which also when IEEE802.16e is used in an access system of the next generation network, an end-to-end QoS is kept, and comfortable communication can be performed. In a wireless access system including the next generation network as a core network, in a terminal for BWA (the wireless terminal device), an SDP generating section generates a session description protocol (SDP) corresponding to an application, an SDP analysis section analyzes the SDP, a packet classifier section distributes an IP packet to each queue of a QoS class, and a DSA-REQ message generating section sets a QoS parameter of a DSA-REQ message to generate the DSA-REQ message, and reports the message to a wireless base station for the BWA.

5 Claims, 7 Drawing Sheets

(56) References Cited

OTHER PUBLICATIONS

IEEE Std 802.16e-2005 and IEEE Std 802.16-2004/Corl-2005, Part 16: Air Interface for Broadband Wireless Access Systems, Amendment 2: Physical and Medium Access Control Layers for Combined Fixed and Mobile Operation in Licensed Bands and Corrigendum 1, Feb. 28, 2006.

M. Handley et al., IETF RFC4566 "SDP: Session Description Protocol," Jul. 2006, University of Glasgow, 49 pages.

* cited by examiner

FIG.5

|  | TOP PRIORITY CLASS | HIGH PRIORITY CLASS | PRIORITY CLASS |
|---|---|---|---|
| m rows/a rows of SDP | Any one of cases (1) and (2) below : <br>(1)media-type = video and a = sendrecv <br>(2)media-type = audio and a = sendrecv | Any one of cases (1) to (4) below : <br>(1)media-type = video and a = sendonly <br>(2)media-type = video and a = recvonly <br>(3)media-type = audio and a = sendonly <br>(4)media-type = audio and a = recvonly | media-type = application |

FIG.6

| PRIORITY CLASS OF NGN | TOP PRIORITY CLASS | HIGH PRIORITY CLASS | PRIORITY CLASS | |
|---|---|---|---|---|
| m rows/a rows of SDP | Any one of cases (1) and (2) below : <br>(1)media-type = video and a = sendrecv <br>(2)media-type = audio and a = sendrecv | Any one of cases (1) and (2) below : <br>(1)media-type = video and a = sendonly <br>(2)media-type = audio and a = send | media-type = application | |
| QoS CLASS OF BWA | UGS | rtPS | nrtPS | BE |

| TCP/UDP PORT NUMBER (m=port number of SDP) | QoS CLASS OF BWA |
|---|---|
| 5060 | nrtPS |
| 26696 | nrtPS |
| - | BE |

FIG.9

| TYPE | LENGTH | VALUE | SCOPE |
|---|---|---|---|
| [145/146].9 | 4 | RATE (IN BITS PER SECOND) | DSx-REQ<br>DSx-RSP<br>DSx-ACK<br>REG-RSP |

FIG.10

| TYPE | LENGTH | VALUE | SCOPE |
|---|---|---|---|
| 145.11 | 1 | 0:RESERVED<br>1:UNDEFINED (BS implementation-dependent[a])<br>2:BE(DEFAULT)<br>3:nrtPS<br>4:EXETENDED rtPS<br>6:UGS<br>7-255:RESERVED | DSA-REQ<br>DSA-RSP<br>DSA-ACK |

FIG.11

| TYPE | LENGTH | VALUE | SCOPE |
|---|---|---|---|
| [145].41 | 2 | MILLISECONDS | DSA-REQ. DSA-RSP. DSC-REQ. DSC-REP |

WIRELESS TERMINAL DEVICE

This is a Continuation of PCT/JP2009/004016 filed Aug. 21, 2009 and published in Japanese, which has a priority of Japanese no. 2008-229776 filed Sep. 8, 2008, hereby incorporated by reference.

BACKGROUND OF THE INVENTION

1. Field of the Invention

The present invention relates to a wireless terminal device for use in a broadband wireless access system (BWA) and, more particularly, it relates to a wireless terminal device which maps a quality of service (QoS: quality securing) level of Layer 2 designated by a communication protocol and a content of a session description protocol (SDP: a protocol in which information on a session is described).

2. Description of the Related Art

It is to be noted that a QoS is a service function of reserving a band for specific communication to secure a fixed communication quality in a network.

Moreover, an SDP is specifically a protocol which depicts information on a session between terminals to exchange information necessary for transmitting/receiving a video or audio signal.

A wireless terminal device for a broadband wireless access system is manufactured according to IEEE802.16e standard of Non-Patent Documents 1 and 2 described hereinafter.

However, in the IEEE802.16e standard, as shown in FIG. 2, the standard is regulated only up to Layer 2. That is, the QoS in Layer 2 between the wireless terminal device for a BWA and a wireless base station for the BWA is regulated by the IEEE802.16e standard, but a mapping method of the QoS of an application of the wireless terminal device and the QoS of Layer 2 is not regulated.

Moreover, the QoS in a wire zone of the wireless base station in the whole network shown in FIG. 1 is not regulated. Therefore, the QoS in end-to-end (a zone from the BWA wireless terminal device to a phone for voice over IP in FIG. 1) cannot be ensured.

Furthermore, at present, on a wire core networks side, development of the next generation network (NGN) steadily progresses, and as disclosed in Non-Patent Document 4 described later, it is determined that the QoS is controlled by using the SDP disclosed in Non-Patent Document 3, but Non-Patent Document 4 does not disclose a relation with respect to the QoS level of the IEEE802.16e standard of Non-Patent Documents 1 and 2.

Therefore, when IEEE802.16e is used in an access system of the next generation network of Non-Patent Document 4, the QoS level on the next generation network side shown in FIG. 11 needs to be combined with the QoS of a zone (a zone between the wireless base station and the wireless terminal device for the BWA) in IEEE802.16e.

Moreover, when communication is started from the wireless terminal device for the BWA, the application in the terminal device needs to clearly determine the QoS of the wireless zone in the BWA, thereby operating the QoS in the wireless zone for the BWA.

To solve the above problem, as in Patent Document 1, there is suggested a method of disposing a policy server in a core network and disposing an application QoS function corresponding to the QoS of the policy server in the wireless terminal device for the BWA.

[Patent Document 1] US2007/0255793 A1, "METHOD FOR PROVIDING SERVICE BETWEEN HETEROGENEOUS NETWORK"

[Non-Patent Document 1] IEEE Std 802.16-2004, Part 16: Air Interface for Fixed Broadband Wireless Access Systems

[Non-Patent Document 2] IEEE Std 802.16e-2005 and IEEE Std 802.16-2004/Corl-2005, Part 16: Air Interface for Broadband Wireless Access Systems, Amendment 2: Physical and Medium Access Control Layers for Combined Fixed and Mobile Operation in Licensed Bands and Corrigendum 1

[Non-Patent Document 3] IETF RFC4566 "SDP: Session Description Protocol"

[Non-Patent Document 4] Next Generation Network Interface Data (IP Communication Network/LAN type Communication Network)-Network-Network Interface (NNI)-Appendix 2: IP Transport Specifications

SUMMARY OF THE INVENTION

However, as in a communication sequence of FIG. 3 and FIG. 4 of Patent Document 1, during communication, a QoS parameter has to be exchanged between a policy server and a wireless terminal device, whereby in case of an application such as VoIP which requires real time properties, a problem occurs that response properties of VoIP communication deteriorate.

Moreover, the policy server has to be prepared in a core network, and a problem occurs that when this policy server shuts down, QoS does not operate.

Therefore, to decrease the occurrence of the problem due to the shutdown of the sever, the policy server can be provided with a redundant constitution to lower a probability at which the server shuts down in the whole system, but a problem occurs that an amount of equipment investment increases owing to the redundant constitution.

The present invention has been developed in view of the above situation, and an object thereof is to provide a wireless terminal device in which also when IEEE802.16e is used in an access system of the next generation network, an end-to-end QoS can be kept to perform comfortable communication.

Moreover, another object of the present invention is to provide a wireless terminal device which does not use any policy server, whereby it is possible to lower the amount of equipment investment and eliminate communication trouble due to shutdown of the server.

Means for Solving the Problem

To solve the above problems of the conventional examples, according to the present invention, there is provided a wireless terminal device connected to a wireless access system including a core network, wherein a parameter of a protocol concerning a communication session in the core network includes a priority class of a service of an application which performs the communication and a used port number, and the priority class of the service included in the parameter of the protocol concerning the communication session and a QoS level used in QoS control of uplink in the wireless access system are stored as a correspondence table, to determine the QoS level of the communication session based on the priority class of the service included in the parameter of the protocol concerning the communication session in accordance with the correspondence table and to associate the determined QoS level with the port number included in the parameter, thereby distributing a packet passing through a port having the port number to a transmission queue of the QoS level, which produces an effect that mapping of the QoS level and the parameter can be realized, comfortable communication can be performed, and need for installation of a policy server in the core network can be obviated.

Moreover, according to the present invention, in the above wireless terminal device, at least the QoS level determined in accordance with the correspondence table is set to a parameter of a message reported to a wireless base station to set a QoS of the uplink in a wireless access network.

Furthermore, according to the present invention, there is provided a wireless terminal device connected to a wireless access system including a core network, comprising: an application section which performs communication via the wireless access system; a parameter generating section which generates a parameter including a priority class of a service of an application to perform the communication and a used port number as a parameter of a protocol concerning a communication session in the core network in accordance with the service in the application section; a parameter analysis section which determines a QoS level of the communication session in accordance with a correspondence table to beforehand associate the priority class included in the parameter of the protocol concerning the communication session in the core network with the QoS level used in QoS control of uplink in the wireless access system and which associates the determined QoS level with the port number included in the parameter; and a packet classifier section which distributes a packet of application data output from the application section to pass through a port having the port number to a transmission queue of the QoS level based on the QoS level and the port number determined by the parameter analysis section, which produces an effect that mapping of the QoS level and the parameter can be realized, comfortable communication can be performed, and need for installation of a policy server in the core network can be obviated.

In addition, according to the present invention, the above wireless terminal device comprises a message generating section which generates a message reported to a wireless base station to set a QoS of the uplink in a wireless access network, wherein the message generating section sets the QoS level determined by the parameter analysis section to the message.

BRIEF DESCRIPTION OF THE DRAWINGS

FIG. 5 is a diagram showing a designation method of a transfer quality class by an SDP;

FIG. 6 is a diagram showing a correspondence table of a priority class of an NGN and a QoS of the BWA;

FIG. 9 is a diagram showing a minimum reserved traffic rate parameter;

FIG. 10 is a diagram showing a UL grant scheduling type parameter; and

FIG. 11 is a diagram showing an unsolicited polling interval parameter.

DESCRIPTION OF REFERENCE NUMERALS

Figure 1:
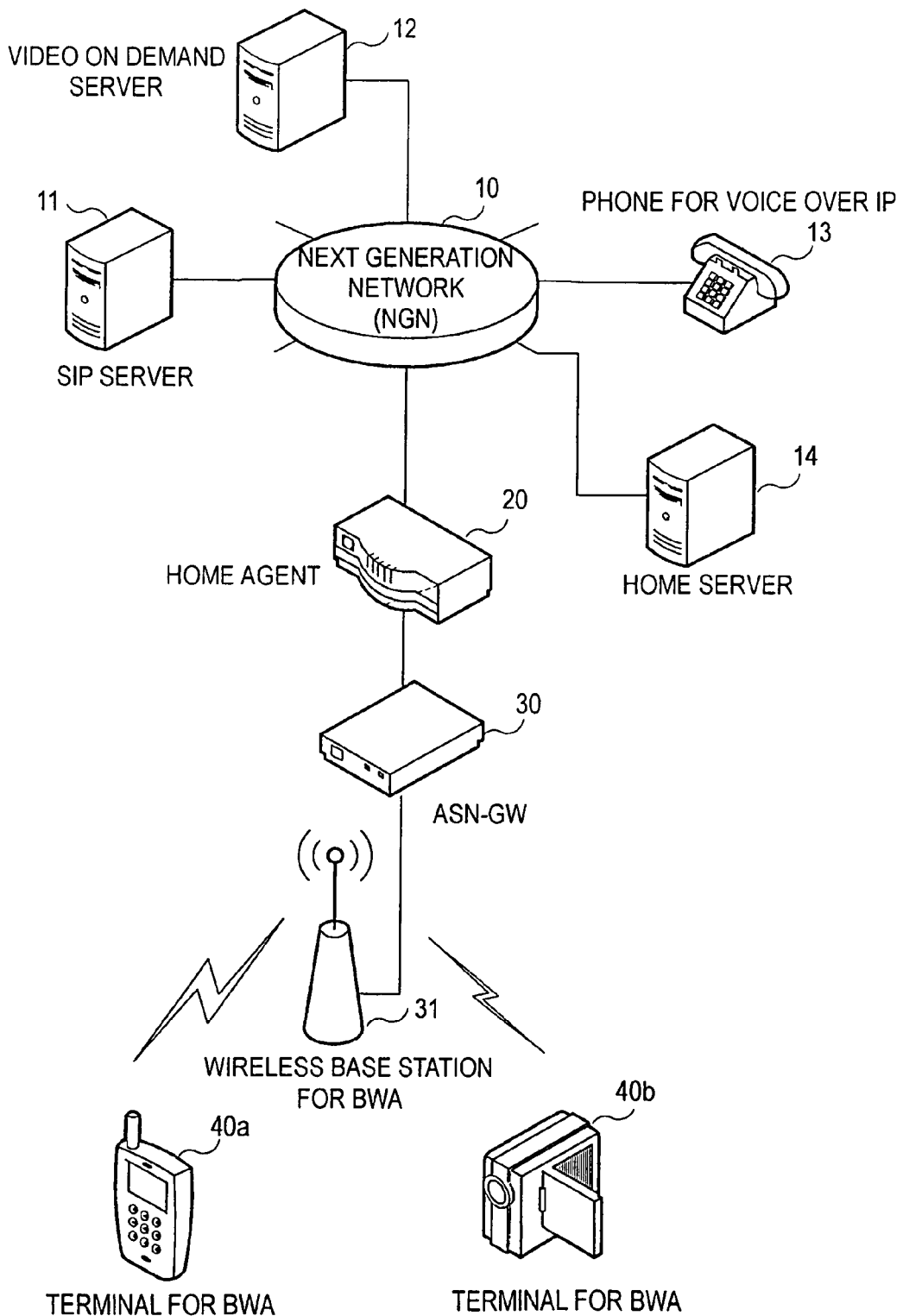
FIG. 1 is a constitution block diagram of a network system according to an embodiment of the present invention.

10 . . . next generation network (NGN), 11 . . . session initiation protocol (SIP) server, 12 . . . video on demand (VoD) server, 13 . . . phone for voice over IP (VoIP), 14 . . . home server, 20 . . . home agent, 30 . . . access service network-gateway (ASN-GW), 31 . . . wireless base station for BWA, 40a and 40b . . . terminal for BWA, 41 . . . SDP generating section, 42 . . . SDP analysis section, 43 . . . DSA-REQ message generating section, 44 . . . application section, 45 . . . TCP/UDP section, 46 . . . IP section, 47 . . . packet classifier section, 48 . . . UGS section, 49 . . . extended rtPS section, 50 . . . rtPS section, 51 . . . nrtPS section, 52 . . . BE section, 53 . . . scheduler section, and 54 . . . IEEE802.16e OFDMA PHY section.

DESCRIPTION OF THE PREFERRED EMBODIMENT

An embodiment of the present invention will be described with reference to the drawings.

SUMMARY OF THE EMBODIMENT

According to a wireless terminal device of the embodiment of the present invention (hereinafter referred to as the present wireless terminal device), a wireless terminal device utilizing a service of an application takes the initiative to set a QoS of uplink in a wireless access network system including the next generation network as a core network, whereby comfortable communication can be realized, and a policy server or the like does not have to be disposed in the core network.

The present wireless terminal device is a wireless terminal device having a function of associating a content of an SDP with a QoS level of the uplink.

Moreover, the present wireless terminal device is a wireless terminal device having a function of associating an IP packet using a port number designated by m=port number in the SDP with the above QoS level to distribute the IP packet passing through a port having the port number to a queue of the QoS level, and a packet classifier function.

Furthermore, in a communication flow starting from a terminal for BWA (an MS initiated service flow), in case of the SDP of media-type=video and a=sendrecv, the present wireless terminal device selects the service flow of an unsolicited grant service (UGS), designates the UGS by a UL grant scheduling type parameter in a DSA-REQ message, and transmits the IP packet using the port number designated by m=port number in the SDP at the QoS level of the UGS.

Additionally, in the communication flow starting from the terminal for the BWA, in case of the SDP of media-type=audio and a=sendrecv, the present wireless terminal device selects the service flow of the UGS, designates the UGS by the UL grant scheduling type parameter in the DSA-REQ message, and transmits the IP packet using the port number designated by m=port number in the SDP at the QoS level of the UGS.

Moreover, in the communication flow starting from the terminal for the BWA, in case of the SDP of media-type=video and a=sendonly, the present wireless terminal device selects the service flow of a real-time polling service (rtPS), designates the rtPS by the UL grant scheduling type parameter in the DSA-REQ message, and transmits the IP packet using the port number designated by m=port number in the SDP at the QoS level of the rtPS.

Furthermore, in the communication flow starting from the terminal for the BWA, in case of the SDP of media-type=audio and a=sendonly, the present wireless terminal device selects the service flow of the real-time polling service (rtPS), designates the rtPS by the UL grant scheduling type parameter in the DSA-REQ message, and transmits the IP packet using the port number designated by m=port number in the SDP at the QoS level of the rtPS.

Additionally, in the communication flow starting from the terminal for the BWA, in case of the SDP of media-type=data, the present wireless terminal device selects the service flow of a non-real-time polling service (nrtPS), designates the nrtPS by the UL grant scheduling type parameter in the DSA-REQ message, and transmits the IP packet using the port number designated by m=port number in the SDP at the QoS level of the nrtPS.

Moreover, in the communication flow starting from the terminal for the BWA, in case of the communication flow in which any SDP is not used, the present wireless terminal device selects the service flow of the best effort (BE), and designates the BE by the UL grant scheduling type parameter in the DSA-REQ message.

Furthermore, when a=ptime:a value (e.g., a=ptime:20) is present in the SDP and the present wireless terminal device generates the DSA-REQ message of communication corresponding to this SDP, the device sets this value to a value of an unsolicited polling interval in the DSA-REQ message.

In addition, when a=rtpmap:0 PCMU/8000 is present in the SDP and the present wireless terminal device generates the DSA-REQ message of the communication corresponding to this SDP, the device sets a value of 100000 to 160000 to a value of a minimum reserved traffic rate in the DSA-REQ message.

[Summary of Network System: FIG. 1]

A network system according to the embodiment of the present invention will be described with reference to FIG. 1. FIG. 1 is a constitution block diagram of the network system according to the embodiment of the present invention.

The network system according to the embodiment of the present invention (the present system) has a constitution around a next generation network (NGN) 10 as shown in FIG. 1, the NGN 10 is connected to a session initiation protocol (SIP) server 11, a video on demand (VoD) server 12, a phone 13 for voice over IP (VoIP) and a home server 14, the NGN 10 is further connected to a home agent 20 and connected to a wireless base station 31 for the BWA via an access service network-gateway (ASN-GW) 30, and the present system basically includes terminals 40a and 40b for the BWA wirelessly connected to the base station 31.

Here, a phone for wireless communication is illustrated as the terminal 40a for the BWA, and a video camera for the wireless communication is illustrated as the terminal 40b for the BWA.

[Respective Components of Network System]

Next, respective components in the present system will specifically be described.

The NGN 10 is the next generation network disclosed in the above prior art document.

The SIP server 11 is a server for performing call control by communication based on an internet protocol (IP).

The VoD server 12 is a server which stores image contents and supplies these image contents when a viewer desires to see the contents.

The phone 13 for the VoIP is a phone corresponding to the VoIP.

The home server 14 is a server having a central function of a household communication network (household LAN), and supplies various data and services to apparatuses of rooms connected to the network. In particular, the server is a large-capacity apparatus for exclusive use having a function of accumulating and distributing data such as images and music.

The home agent 20 supports a mobile IP, and enables movement of the terminal 40 for the BWA.

The ASN-GW 30 is an apparatus which bundles a plurality of base stations 31 for the BWA, supports handover or paging and has a packet routing function.

The plurality of base stations 31 for the BWA are arranged for areas, are connected to the ASN-GW 30, and have a broadband wireless access to the terminal 40 for the BWA.

The terminals 40a and 40b for the BWA are connected to the wireless base station 31 for the BWA in each area by the broadband wireless access. A specific constitution and processing of the terminal 40 for the BWA will be described later.

It is to be noted that a server of each component in the above network system basically comprises a computer, and hence the server includes a control section such as a central processing unit (CPU), a storage section such as a main memory or a hard disk and the like, and includes processing means for performing respective functions by an operation of a computer program.

Moreover, the present system in FIG. 1 is characterized in that any policy server is not disposed. Since the policy server is not necessary, communication trouble due to shutdown of the policy server can be prevented.

Figure 2:
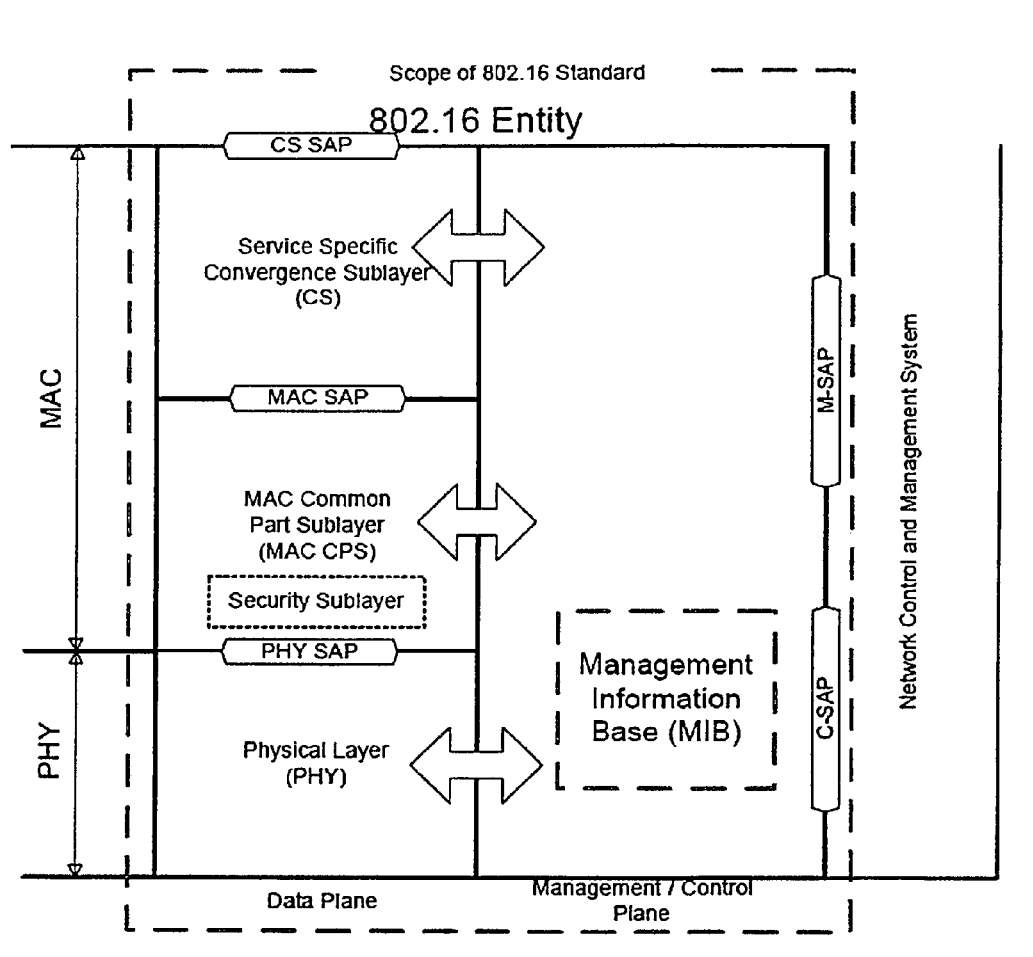
FIG. 2 is a diagram showing a protocol architecture model of IEEE Std. 802.16.

[Protocol Architecture Mode: FIG. 2]

Here, IEEE Std. 802.16 Protocol Architecture Model regulated in Non-Patent Document 1 is shown in FIG. 2. FIG. 2 is a diagram showing the protocol architecture model of IEEE Std. 802.16.

As shown in FIG. 2, the IEEE standard regulates the standard only up to MAC of Layer 2.

Figure 3:
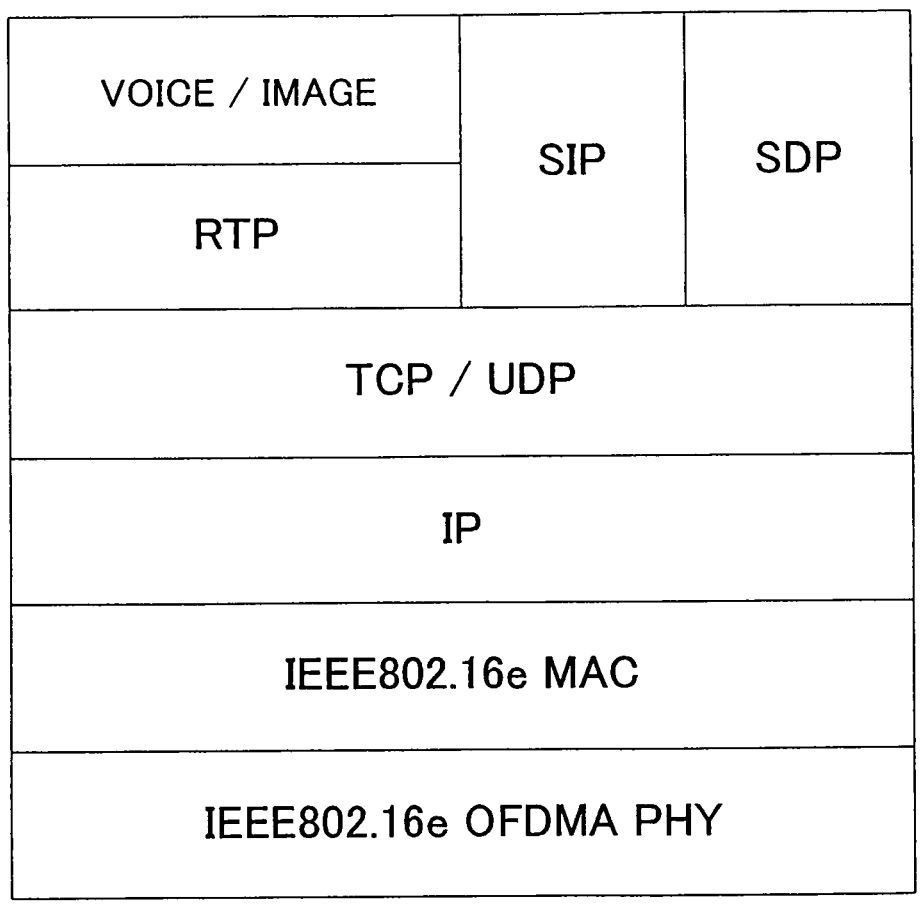
FIG. 3 is a diagram showing an example of a protocol stack of a terminal for BWA.

[Protocol Stack: FIG. 3]

Next, an example of a protocol stack of the terminal for the BWA will be described with reference to FIG. 3. FIG. 3 is a diagram showing the example of the protocol stack of the terminal for the BWA.

As shown in FIG. 3, the protocol stack is characterized by supporting SIP and SDP. Moreover, as one example of the application, voice and image are described. Additionally, examples of the application include an e-mail client and a WWW browser.

Moreover, in the terminal for the BWA, Layer 2 includes IEEE802.16e media access control (MAC), and Layer 1 is an IEEE802.16e orthogonal frequency division multiple access (OFDMA) physical layer (PHY).

Figure 4:
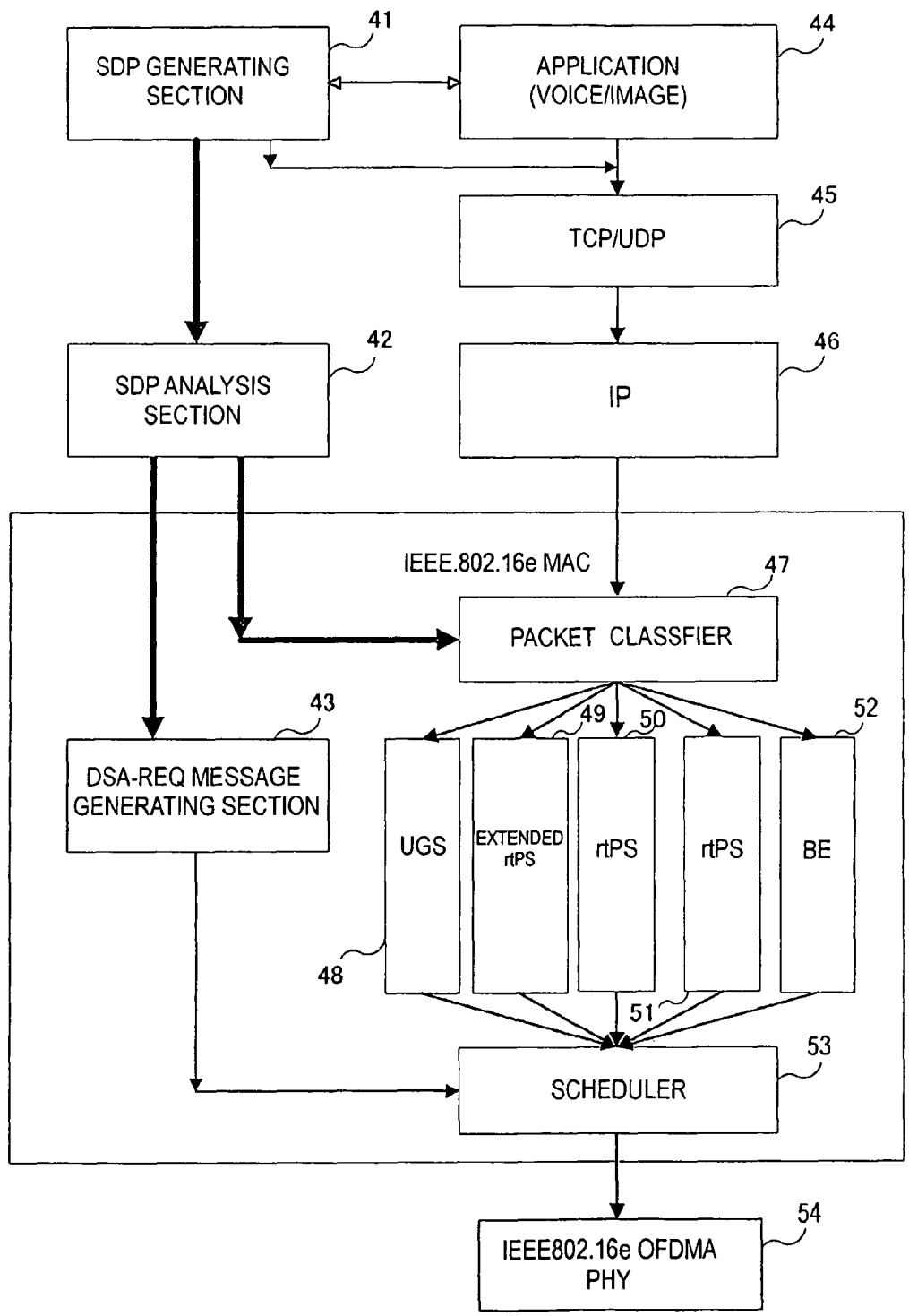
FIG. 4 is a diagram showing a constitution in the terminal for the BWA and a flow of application data.

[Internal Constitution of Terminal for BWA: FIG. 4]

Next, a constitution inside the terminal for the BWA and a flow of the application data will be described with reference to FIG. 4. FIG. 4 is a diagram showing the constitution in the terminal for the BWA and the flow of the application data.

As shown in FIG. 4, the terminal for the BWA contains an SDP generating section 41, an SDP analysis section 42, a DSA-REQ message generating section 43, an application section 44, a TCP/UDP section 45, an IP section 46, a packet classifier section 47, a UGS section 48, an extended rtPS section 49, an rtPS section 50, a nrtPS section 51, a BE section 52, a scheduler section 53 and an IEEE802.16e OFDMA PHY section 54.

The SDP generating section 41 generates the SDP in accordance with the use application of the terminal 40 for the BWA. Details of the SDP generating section 41 will be described later.

The SDP analysis section 42 includes a correspondence table of the priority class of the NGN and the QoS class of the BWA, analyzes the SDP to determine the QoS class of the BWA corresponding to the priority class of the NGN, generates the correspondence table of the port number and the determined QoS class, and reports the correspondence table to the packet classifier section 47 to distribute the IP packet to each queue of the QoS class.

Moreover, when the SDP analysis section 42 analyzes the SDP to determine the QoS class of the BWA corresponding to the priority class of the NGN, the section gives an instruction to set the QoS class in the DSA-REQ message, and then gives another instruction.

Details of the SDP analysis section 42 will be described later.

The DSA-REQ message generating section 43 sets the QoS parameter of the DSA-REQ message in accordance with the instruction of the SDP analysis section 42 to generate the DSA-REQ message, thereby reporting the message to the wireless base station for the BWA.

The application section 44 inputs the data of the voice and images, and sends the content of the data to the SDP generating section 41 to output the data to the TCP/UDP section 45.

The TCP/UDP section 45 inputs the data from the application section 44 and the SDP to be informed from the SDP generating section 41 to a communication target in accordance with a transmission control protocol (TCP)/user datagram protocol (UDP) as a protocol of a transport layer, whereby processing of data transfer management is performed to output the processed data to the IP section 46.

The IP section 46 performs routing or the like to determine the route of IP datagram in a network layer, and outputs the data to the packet classifier section 47.

The packet classifier section 47 performs processing of distributing the IP packet to each queue of the QoS class based on the correspondence table of the port number and the QoS class informed from the SDP analysis section 42.

The UGS section 48 performs data processing in an unsolicited grant service (UGS) mode to transmit a fixed amount of data in real time.

The extended rtPS section 49 performs data processing in an extended real time polling service (rtPS) mode to transmit data with a silent compressing function (voice data with the silent compressing function).

The rtPS section 50 performs data processing in a real time polling service (rtPS) mode to transmit a variable amount of data in real time.

The nrtPS section 51 performs data processing in a non real time polling service (nrtPS) mode to transmit the variable amount of the data occasionally, although time delay is allowed.

The BE section 52 performs data processing in an unguaranteed best effort (BE) mode in which the delay is not regulated, and jitter is also not regulated.

The scheduler section 53 assigns a band and time to the data processed at each QoS class in a wireless frame of each terminal in accordance with the DSA-REQ message generated by the DSA-REQ message generating section 43.

The IEEE802.16e OFDMA PHY section 54 realizes the transmission of the wireless frame input from the scheduler section 53 in a physical layer (PHY) by an orthogonal frequency division multiple access (OFDMA) system of IEEE802.16e.

In FIG. 4, a bold line from the SDP generating section 41 to the SDP analysis section 42 and further bold lines to the DSA-REQ message generating section 43 and the packet classifier section 47 indicate the flow of control information to the respective functional sections by the SDP. Moreover, fine lines from the application section 44 to the IEEE802.16e OFDMA PHY section 54 indicate the flow of the application data while focusing on uplink communication.

[SDP Generating Section 41]

Next, the SDP generating section 41 will be described.

When the terminal for the BWA is a TV phone and bidirectional communication of moving image data is performed, a moving image application and the SDP generating section 41 cooperate, and the SDP generating section 41 generates the SDP of media-type video and a=sendrecv. Details of the SDP are disclosed in Non-Patent Document 3.

Moreover, when the VoIP phone is used as the terminal for the BWA, a VoIP application and the SDP generating section 41 cooperate, and the SDP generating section 41 generates the SDP of media-type=audio and a=sendrecv. Moreover, when VoIP voice codec is G.711, an SDP of a=rtpmap:0 PCMU/8000 is generated. Furthermore, when a VoIP packet forming cycle is 20 msec, the SDP generating section 41 generates an SDP of a=ptime:20.

Moreover, the SDP generating section 41 writes a communication port used by the application data as m=port number in the SDP.

The SDP generating section 41 is a functional section which generates call control information of the application in accordance with the session description protocol (SDP) of Non-Patent Document 3, and is usually used in the VoIP phone or the like. Moreover, the SDP prepared by the SDP generating section 41 is sent to the SDP analysis section 42, and the TCP/UDP section 45 to inform the protocol to the communication target.

[SDP Analysis Section 42]

Next, the SDP analysis section 42 will be described. The SDP analysis section 42 is the most important function in this invention.

[Correspondence between Priority Class and BWA QoS: FIGS. 5 and 6]

The SDP analysis section 42 has a correspondence table of the priority class of the NGN and the QoS class of the BWA of FIG. 6. In the correspondence table of FIG. 6, the table of FIG. 5 is associated with the QoS class of the BWA. Here, FIG. 5 is a diagram showing a designation method of a transfer quality class by the SDP, and FIG. 6 is a diagram showing the correspondence table of the priority class of the NGN and the QoS class of the BWA.

The SDP analysis section 42 analyzes the m rows/a rows of the SDP to determine the QoS class of the BWA of FIG. 6 corresponding to the m rows/a rows.

Figures 7, 8:
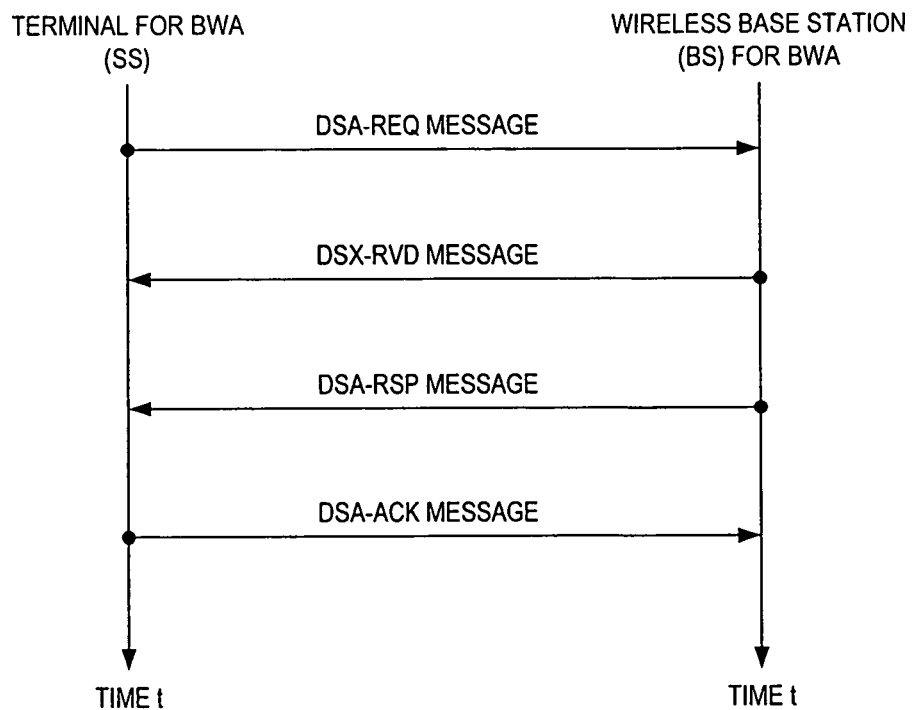
FIG. 7 is a diagram showing an example of a correspondence table of a port number of m=port number of the SDP and a QoS class of the BWA.
FIG. 8 is a diagram showing a setting sequence of the QoS class in a BWA wireless zone.

[Correspondence Between Port Number and QoS Class of BWA: FIG. 7]

Moreover, a correspondence table of the port number and the QoS class of the BWA shown in FIG. 7 is generated from the port number of m=port number of the SDP and the previously determined QoS class, and this correspondence table is informed to the packet classifier section 47 of FIG. 4. FIG. 7 is a diagram showing an example of the correspondence table of the port number of m=port number of the SDP and the QoS class of the BWA.

The packet classifier section 47 of FIG. 4 distributes the IP packet to each queue of the QoS class in accordance with this correspondence table of FIG. 7. Moreover, the IP packet having the port number which is not clearly indicated in the correspondence table of FIG. 7 is treated as the BE.

[Instruction to DSA-REQ Message Generating Section 43]

Next, an instruction given to the DSA-REQ message generating section 43 by the SDP analysis section 42 will be described.

The SDP analysis section 42 analyzes the m rows/a rows of the SDP, determines the QoS class of the BWA of FIG. 6, and instructs the DSA-REQ message generating section 43 to set the QoS class to the UL grant scheduling type parameter in the DSA-REQ message.

Moreover, when a=ptime:a value is present in the SDP, the SDP analysis section 42 gives an instruction to set this value to the value of the unsolicited polling interval in the DSA-REQ message.

Furthermore, when a=rtpmap:0 PCMU/8000 is present in the SDP, the SDP analysis section 42 gives an instruction to set a value of 100000 to 160000 to the value of the minimum reserved traffic rate in the DSA-REQ message.

In case of PCMU/8000, the amount of the IP packet of one-way communication is 80000 bps, but in a BWA wireless communication zone, MAC header of the BWA is added to this IP packet. Furthermore, in BWA communication, communication by piggyback can be performed, and hence the increase of the amount of the data due to the piggyback occurs. Therefore, a transmission amount larger than 80000 bps is necessary. The amount of the piggyback depends on the variance of a wireless electric wave level, and hence cannot uniquely be determined. Therefore, the value is from 100000 to 160000.

[DSA-REQ Message Generating Section 43]

The DSA-REQ message generating section 43 sets the QoS parameter of the DSA-REQ message as follows to generate the DSA-REQ message in accordance with the instruction of the SDP analysis section 42.

DSA-REQ Message
  UL grant scheduling type parameter
  Minimum reserved traffic rate
  unsolicited polling interval This generated DSA-REQ message is reported to the wireless base station for the BWA through the scheduler section 53 and the IEEE802.16e OFDMA PHY section 54 of FIG. 4.

A communication sequence of FIG. 7 is a setting sequence of the QoS class in the uplink communication of the BWA wireless zone, and this sequence is also used for the above DSA-REQ message. When DSA-ACK ends, the setting of the QoS class in the BWA wireless zone ends, and the QoS in the wireless zone operates.

For example, an example of VoIP communication in which the terminal for the BWA is a transmitter will be described. The SDP generating section 41 cooperates with the VoIP application to generate the SDP including a content as follows:

M=audio 26696 RTP/AVP 0
  a=rtpmap:0 PCMU/8000
  a=sendrecv
  a=ptime:20

Next, the SDP analysis section 42 analyzes this SDP to add the port number:26696 and the BWA QoS class:UGS to the port number and BWA QoS class of the correspondence table of FIG. 7, and informs the table to the packet classifier section 47 of FIG. 4.

The packet classifier section 47 of FIG. 4 inputs the IP packet of the port number 26696 into the UGS queue.

Moreover, the SDP analysis section 42 instructs the DSA-REQ message generating section 43 to set the DSA-REQ message as follows.

DSA-REQ Message
  UL grant scheduling type parameter: UGS
  Minimum reserved traffic rate: 104000
  unsolicited polling interval: 20

[Communication Sequence: FIG. 8]

The DSA-REQ message generating section 43 generates the DSA-REQ message to which the above has been set, and reports the message to the wireless base station for the BWA. The subsequent communication sequence is shown in FIG. 8, and the QoS of the uplink in the BWA wireless zone is set. Since the QoS class in the BWA wireless zone is UGS, the class becomes top priority in the BWA wireless zone. FIG. 8 is a diagram showing the setting sequence of the QoS class in the BWA wireless zone.

Moreover, this SDP communication belongs to the top priority class in the priority class of the NGN of FIG. 5, and hence the communication also becomes the top priority in the NGN network.

Since the communication becomes the top priority in both the BWA wireless zone and the NGN, the communication becomes the top priority in end-to-end, which enables the VoIP communication with less delay.

A part of the QoS parameter of the DSA-REQ message is regulated in Non-Patent Document 1. The parameter is set, whereby the QoS in the wireless zone between the wireless base station for the BWA and the terminal for the BWA can be received.

[QoS Parameter in DSA-REQ Message: FIGS. 9 to 11]

In FIGS. 9 to 11, each of the QoS parameters in the DSA-REQ message is shown in detail, and regulated in Non-Patent Documents 1 and 2. FIG. 9 is a diagram showing the minimum reserved traffic rate parameter, FIG. 10 is a diagram showing the UL grant scheduling type parameter, and FIG. 11 is a diagram showing the unsolicited polling interval parameter.

Moreover, in downlink communication in which the wireless base station for the BWA is a transmission side and the terminal for the BWA is a reception side, the DSA-REQ message is issued by the wireless base station for the BWA. Conversely, in uplink communication in which the wireless base station for the BWA is the reception side and the terminal for the BWA is the transmission side, the DSA-REQ message is issued by the terminal for the BWA.

A BWA communication system is a central control system by the MAC scheduler of the wireless base station for the BWA, and hence to perform the QoS in the uplink communication, the terminal for the BWA has to issue the DSA-REQ message to notify the wireless base station for the BWA of the QoS level of the communication to be performed.

The MAC scheduler of the wireless base station for the BWA checks the QoS level or the parameter of the DSA-REQ message from each terminal to control a band assignment amount or an assignment time of the wireless frame of each terminal.

The BWA usually has a mechanism in which the UGS of FIG. 4 has the highest priority and the BE has the lowest priority. Therefore, the degree of the priority has an order of UGS>extended rtPS>rtPS>nrtPS>BE.

In FIG. 5, the priority level in the next generation network (NGN) of FIG. 1 and the content of the SDP corresponding to the level are shown in the table. This table is written in Non-Patent Document 4, Table a-1: Transfer quality class designation by SDP.

In the present embodiment, priority classes (the top priority class, the high priority class and the priority class) on the NGN side of FIG. 5 are associated with five stages of QoS classes (UGS, extended rtPS, rtPS, nrtPS and BE) in the BWA wireless zone of FIG. 4, and FIG. 6 is the correspondence table.

The extended rtPS of the BWA is the QoS class for VoIP having a silent compressing function, and the NGN does not perform the VoIP communication using silent compression, whereby association with this QoS class is not performed.

Moreover, the BE of the BWA is associated with a part of the NGN in which any priority class is not present. A reason for this is that the end-to-end QoS including the NGN cannot be ensured, and hence the BE is set also in the BWA wireless zone.

Effect of the Embodiment

According to the embodiment of the present invention, also when the broadband wireless access system (BWA) is used in the access system of the next generation network, the end-to-end quality of service (QoS) can be performed, which produces an effect that comfortable communication can be realized.

Moreover, according to the present system, since any policy server is not used, communication trouble due to shutdown of the policy server can be prevented, and an effect of cost saving can be produced.

The present invention is suitable for the wireless terminal device in which also when IEEE802.16e is used in the access system of the next generation network, the end-to-end QoS can be kept, and comfortable communication can be performed.

What is claimed is:

1. A wireless terminal device connected to a wireless access system including a core network, comprising:
   an application section which outputs application data of an application that performs communication via the wireless access system;
   a parameter generating section which generates a parameter including a priority class of a service of the application and a used port number as a parameter of a protocol concerning a communication session in the core network in accordance with the service of the application;
   a transport layer processing section which processes the application data output from the application section and the parameter generated by the parameter generating section in accordance with a protocol of a transport layer;
   a network layer processing section which processes the data processed by the transport layer processing section in accordance with a protocol of a network layer;
   a parameter analysis section which determines a quality of service (QoS) level of the communication session that corresponds to the priority class of the parameter in accordance with a correspondence table to beforehand associate the priority class with the QoS level used in QoS control of uplink in a wireless zone of the wireless access system and which associates the determined QoS level with the port number of the parameter that includes the priority class associated with the determined QoS level in the correspondence table; and
   a packet classifier section which distributes a packet of the processed data by the network layer processing section to a transmission queue of the QoS level,
   wherein the packet of the processed data having the port number associated with the determined QoS level is distributed to the transmission queue of the determined QoS level.

2. The wireless terminal device according to claim 1, further comprising:
   a message generating section which generates a message reported to a wireless base station to set a QoS of the uplink in the wireless zone of the wireless access system,
   wherein the message generating section sets the QoS level determined by the parameter analysis section to the message.

3. The wireless terminal device according to claim 1, wherein the wireless zone of the wireless access system is between the wireless terminal device and a wireless base station.

4. The wireless terminal device according to claim 1, wherein the QoS level is that of IEEE802.16e standard.

5. The wireless terminal device according to claim 1, wherein the parameter generated by the parameter generating section is a parameter of Session Description Protocol (SDP).

* * * * *